US009267803B2

(12) United States Patent
Kalai et al.

(10) Patent No.: US 9,267,803 B2
(45) Date of Patent: Feb. 23, 2016

(54) METHOD AND APPARATUS OF ROUTE GUIDANCE

(75) Inventors: Iljya Kalai, Seattle, WA (US); Keith Ito, Seattle, WA (US); Andrey Yuryevich Ulanov, Seattle, WA (US); Andrew Tesch Miller, Seattle, WA (US); Michael Siliski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/313,628

(22) Filed: Dec. 7, 2011

(65) Prior Publication Data

US 2012/0143504 A1 Jun. 7, 2012

Related U.S. Application Data

(60) Provisional application No. 61/420,515, filed on Dec. 7, 2010.

(51) Int. Cl.
*G01C 21/34* (2006.01)
*G01C 21/32* (2006.01)
(Continued)

(52) U.S. Cl.
CPC ............ *G01C 21/32* (2013.01); *G01C 21/3415* (2013.01); *H04L 67/025* (2013.01); *H04L 67/18* (2013.01); *G06F 12/0862* (2013.01)

(58) Field of Classification Search
USPC ......... 701/532–533, 410, 431, 454, 201, 209, 701/412, 420; 709/232, 239, 217, 219; 340/995.1, 995.12, 995.13; 455/421, 455/422.1, 456.1; 345/630, 520, 522; 707/999.107, E17.018, E17.142; 712/207, 205; 711/118, E12.017
See application file for complete search history.

(56) References Cited

U.S. PATENT DOCUMENTS 5,848,373 A * 12/1998 DeLorme et al. ............. 701/455
7,085,916 B1 * 8/2006 Nguyen .................. G06F 9/381
712/207
(Continued)

FOREIGN PATENT DOCUMENTS

CN 101162150 4/2008
CN 101358851 * 2/2009
(Continued)

OTHER PUBLICATIONS

The Storage System for a Multimedia Data Manager Kernel; Valencio, Carlos Roberto ; Almeida, Fabio Renato De ; Machado, Jose Marcio ; Colombini, Angelo Cesar ; Neves, Leandro Alves ; Souza, Rogeria Cristiane Gratao De; Parallel and Distributed Computing, Applications and Technologies (PDCAT), 2013 International Conference on;DOI: 10.1109/PDCAT.20.*
(Continued)

*Primary Examiner* — Cuong H Nguyen
(74) *Attorney, Agent, or Firm* — Lerner, David, Littenberg, Krumholz & Mentlik, LLP

(57) ABSTRACT

Systems and methods of route guidance on a user device are provided. In one aspect, a system and method transmit partitions of map data to a client device. Each map partition may contain road geometries, road names, road network topology, or any other information needed to provide turn-by-turn navigation or driving directions within the partition. Each map partition may be encoded with enough data to allow them to be stitched together to form a larger map. Map partitions may be fetched along each route to be used in the event of a network outage or other loss of network connectivity. For example, if a user deviates from the original route and a network outage occurs, the map data may be assembled and a routing algorithm may be applied to the map data in order to direct the user back to the original route.

22 Claims, 11 Drawing Sheets

(51) Int. Cl.
H04L 29/08 (2006.01)
G06F 12/08 (2006.01)

(56) References Cited

U.S. PATENT DOCUMENTS

| | | | | |
|---|---|---|---|---|
| 8,095,617 | B2* | 1/2012 | Johnsen | G06F 12/0813 709/201 |
| 8,131,718 | B2* | 3/2012 | Tran | 707/732 |
| 8,171,121 | B2* | 5/2012 | Ayyar | G06F 13/4081 709/221 |
| 8,315,791 | B2* | 11/2012 | Bales et al. | 701/301 |
| 8,346,279 | B1* | 1/2013 | Saatchi et al. | 455/456.1 |
| 8,806,177 | B2* | 8/2014 | Krieger | G06F 12/1027 712/207 |
| 2004/0236620 | A1* | 11/2004 | Chauhan et al. | 705/9 |
| 2005/0140524 | A1* | 6/2005 | Kato et al. | 340/995.13 |
| 2006/0026170 | A1* | 2/2006 | Kreitler et al. | 707/10 |
| 2006/0069691 | A1* | 3/2006 | Kawai | 707/100 |
| 2006/0106534 | A1 | 5/2006 | Kawamata et al. | |
| 2007/0011136 | A1* | 1/2007 | Haskin et al. | 707/1 |
| 2007/0050129 | A1* | 3/2007 | Salmre | 701/207 |
| 2008/0070559 | A1* | 3/2008 | Behr et al. | 455/414.2 |
| 2008/0094250 | A1* | 4/2008 | Myr | 340/909 |
| 2008/0103693 | A1* | 5/2008 | Kato et al. | 701/209 |
| 2008/0132249 | A1 | 6/2008 | Hamilton | |
| 2009/0037430 | A1* | 2/2009 | Mukkamala et al. | 707/10 |
| 2009/0048776 | A1* | 2/2009 | Bouillet et al. | 701/210 |
| 2009/0063042 | A1* | 3/2009 | Santesson et al. | 701/209 |
| 2009/0191901 | A1* | 7/2009 | Behr et al. | 455/457 |
| 2009/0326810 | A1 | 12/2009 | Callaghan et al. | |
| 2010/0023252 | A1* | 1/2010 | Mays et al. | 701/201 |
| 2010/0053252 | A1* | 3/2010 | Matsushita | 347/17 |
| 2010/0174721 | A1* | 7/2010 | Mou | 707/741 |
| 2010/0180082 | A1* | 7/2010 | Sebastian et al. | 711/126 |
| 2010/0228478 | A1 | 9/2010 | You | |
| 2010/0250853 | A1* | 9/2010 | Krieger | G06F 12/1027 711/122 |
| 2010/0287207 | A1* | 11/2010 | Motoyama | 707/803 |
| 2010/0332612 | A1* | 12/2010 | Johnsen | G06F 12/0817 709/216 |
| 2011/0046883 | A1* | 2/2011 | Ross et al. | 701/209 |
| 2011/0160995 | A1* | 6/2011 | Geilich et al. | 701/200 |
| 2011/0313649 | A1* | 12/2011 | Bales et al. | 701/200 |
| 2012/0131530 | A1* | 5/2012 | Moffitt et al. | 716/141 |
| 2013/0211705 | A1* | 8/2013 | Geelen et al. | 701/410 |
| 2014/0320509 | A1* | 10/2014 | Chen et al. | 345/501 |

FOREIGN PATENT DOCUMENTS

| | | |
|---|---|---|
| CN | 101358851 A | 2/2009 |
| CN | 101458087 A | 6/2009 |
| EP | 1909066 A1 | 4/2008 |
| JP | 2003004468 | 1/2003 |
| JP | 2003330968 | 11/2003 |
| JP | 2004325366 A | 11/2004 |
| JP | 2010197311 | 9/2010 |
| KR | 20080071228 A | 8/2008 |
| KR | 20100099799 A | 9/2010 |
| WO | 2008069299 A1 | 6/2008 |
| WO | 2009080066 A1 | 7/2009 |

OTHER PUBLICATIONS

A Novel Weighted-Graph-Based Grouping Algorithm for Metadata Prefetching; Peng Gu ; Jun Wang; Yifeng Zhu ; Hong Jiang ; Pengju Shang; Computers, IEEE Transactions on; vol. 59 , Issue: 1; DOI: 10.1109/TC.2009.115; Publication Year: 2010 , pp. 1-15.*

Integrated Google Maps and smooth street view videos for route planning; Chi Peng ; Bing-Yu Chen ; Chi-Hung Tsai Computer Symposium (ICS), 2010 International; DOI: 10.1109/COMPSYM. 2010.5685494; Publication Year: 2010 , pp. 319-324.*

Program Optimization of Stencil Based Application on the GPU-Accelerated System; Guibin Wang ; Xuejun Yang ; Ying Zhang ; Tao Tang ; Xudong Fang; Parallel and Distributed Processing with Applications, 2009 IEEE International Symposium on DOI: 10.1109/ISPA.2009.70; Publication Year: 2009 , pp. 219-225.*

Optimizing Dynamic Programming on Graphics Processing Units Via Data Reuse and Data Prefetch with Inter-Block Barrier Synchronization; Chao-Chin Wu ; Kai-Cheng Wei ; Ting-Hong Lin; arallel and Distributed Systems (ICPADS), 2012 IEEE 18th International Conference on; DOI: 10.1109/ICPADS.2012.17; Publication Year: 2012 , pp. 45-52.*

Cache Organizations for H.264/AVC Motion Compensation; Ju-Hyun Kim ; Gyoung-Hwan Hyun ; Hyuk-Jae Lee; Embedded and Real-Time Computing Systems and Applications, 2007. RTCSA 2007. 13th IEEE International Conference on DOI: 10.1109/RTCSA. 2007.74; Publication Year: 2007, pp. 534-541.*

A combined DMA and application-specific prefetching approach for tackling the memory latency bottleneck; Dasygenis, M. ; Brockmeyer, E. ; Durinck, B. ; Catthoor, F. ; Soudris, D. ; Thanailakis, A.; Very Large Scale Integration (VLSI) Systems, IEEE Transactions on;vol. 14 , Issue: 3; DOI: 10.1109/TVLSI.2006.871759; Pub. Year: 2006 , pp. 279-291.*

A two-phase execution engine of reduce tasks in Hadoop MapReduce; Xiaohong Zhang; Guowei Wang; Zijing Yang; Yang Ding Systems and Informatics (ICSAI), 2012 International Conference on; Year: 2012; pp. 858-864, DOI: 10.1109/ICSAI.2012. 6223144.*

The Research of Improved Pre-fetch Strategy of the Vehicle Terminal Based on the Central Navigation; Mou Heming; Sun Tong; Shi Xiangting; Feng Guochang; Wei Da; Digital Manufacturing and Automation (ICDMA), 2012 Third International Conference on Year: 2012; pp. 931-934, DOI: 10.1109/ICDMA.2012.220.*

Optimizing Dynamic Programming on Graphics Processing Units Via Data Reuse and Data Prefetch with Inter-Block Barrier Synchronization; Chao-Chin Wu; Kai-Cheng Wei; Ting-Hong Lin; Parallel and Distributed Systems (ICPADS), 2012 IEEE 18th International Conference on; Year: 2012; pp. 45-52, DOI: 10.1109/ICPADS.2012. 17.*

Sandbox Prefetching: Safe run-time evaluation of aggressive prefetchers; Pugsley, S.H.; Chishti, Z.; Wilkerson, C.; Peng-fei Chuang; Scott, R.L.; Jaleel, A.; Shih-Lien Lu; Chow, K.; Balasubramonian, R.; High Performance Computer Architecture (HPCA), 2014 IEEE 20th International Symposium on; Year: 2014; pp. 626-637, DOI: 10.1109/HPCA.2014.68.*

Sensorem—an efficient mobile platform for wireless sensor network visualisation; Jin Ming Koh; Sak, M.; Hwee-Xian Tan; Huiguang Liang; Folianto, F.; Quek, T.;Intelligent Sensors, Sensor Networks and Information Processing (ISSNIP), 2015 IEEE Tenth International Conference on; Year: 2015; pp. 1-2, DOI: 10.1109/ISSNIP. 2015.7106971.*

An adaptive multi-module cache with hardware prefetching mechanism for multimedia applications; Jung-Hoon Lee; Gi-Ho Park; Shin-Dug Kim; Parallel, Distributed and Network-Based Processing, 2003. Proceedings. Eleventh Euromicro Conference on Year: 2003; pp. 109-116, DOI: 10.1109/EMPDP.2003.1183574.*

Unbinds data and tasks to improving the Hadoop performance; Kun Lu; Dong Dai; Xuehai Zhou; MingMing Sun; ChangLong Li; Hang Zhuang; Software Engineering, Artificial Intelligence, Networking and Parallel/Distributed Computing (SNPD), 2014 15th IEEE/ACIS International Conference on; Year: 2014; pp. 1-6, DOI: 10.1109/ SNPD.2014.6888710.*

A novel approach to record file correlation and reduce mapping frequency on HDFS based on ExtendHDFS; Chang Xiao; Qiang Li; Dong Zheng; Computer Science and Network Technology (ICCSNT), 2013 3rd International Conference on; Year: 2013 pp. 244-248, DOI: 10.1109/ICCSNT.2013.6967105.*

International Search Report and Written Opinion for Application No. PCT/US2011/063738 dated Jul. 11, 2012.

Chinese Office Action for Application No. 201180066937.3 dated Nov. 19, 2014.

Extended European Search Report for Application No. 11847314.9 dated Apr. 30, 2015.

Japanese Office Action for Application No. 2013-543311 dated Jul. 14, 2015.

* cited by examiner

METHOD AND APPARATUS OF ROUTE GUIDANCE

CROSS-REFERENCE TO RELATED APPLICATIONS

The present application claims the benefit of the filing date of U.S. Provisional Patent Application No. 61/420,515 filed Dec. 7, 2010, the disclosure of which is hereby incorporated herein by reference.

BACKGROUND OF THE INVENTION

1. Field of the Invention

The present application relates generally to navigation systems.

2. Description of Related Art

With the advent of portable electronic devices, navigation systems are now more commonplace with many users worldwide. Portable electronic devices ("client devices") such as mobile telephones, PDAs and laptop/palmtop computers may be used while in transit to a specific destination. Navigation servers typically receive requests from a client device for directions to a destination, generate routes by applying routing algorithms to map data, and subsequently provide the route to the client device. Client devices are also capable of storing map data and routing algorithms locally, allowing them to generate routes without the assistance of a navigation server.

The map data generally contains information regarding the locations of streets, connections between streets, and the costs of transitioning between them. The map data may be modeled as a set of data objects ("segments") connected by links ("arcs") known as a graph. In a graph data model, each segment represents a street while the arcs represent a transition to the next street. Many popular routing algorithms, such as Dijkstra's algorithm, are designed to operate within the graph model. By using conventional graph theory concepts, routing algorithms attempt to calculate the best route based on metrics (e.g., distance, time, etc.).

After determining a route, navigation servers return the route to the requesting client device, whereupon a map image of the route is then rendered on the client device screen. If a user deviates from the original route, the client device may make an additional route request to the navigation server in order to generate a new route based on the current location. In the event of a network outage, however, the client device might have no access to the map data and routing algorithms on the navigation server.

For systems that download map data, the systems may permit users to regularly download new map data to avoid generating routes based on outdated information.

BRIEF SUMMARY

In one aspect, a system and method is provided that allows a client device to generate routing information using up to date map data.

In another aspect, a method of route guidance for mapping on a user device is provided that may prefetch a plurality of map partition data from a remote computer, each of the plurality of map partition data being encoded with information for generating driving directions. The plurality of map partition data may then be stored in a memory, and it may be determined whether the remote computer is accessible. The plurality of map partition data may be retrieved from the memory, if it is determined that the remote computer is not accessible. The map data representing a geographic region may be assembled, the map data being an assemblage of the plurality of map partition data. A best route may then be generated to a destination using the map data.

A further aspect provides an apparatus comprising a memory storing at least one module, the memory having a cache memory enabled to store a plurality of map partition data. A processor may be in communication with the memory so as to process the plurality of map partition data in accordance with instructions of the at least one module. The apparatus may also include a display in communication with, and displaying information received from, the processor. The at least one module may have instructions to prefetch a plurality of map partition data from a remote computer, each of the plurality of map partition data being encoded with information for generating driving directions; to store the plurality of map partition data in a memory; to determine whether the remote computer is accessible; to retrieve the plurality of map partition data from the memory, if it is determined that the remote computer is not accessible; to assemble map data representing a geographic region, the map data being an assemblage of the plurality of map partition data; and, to generate a best route to a destination using the map data.

In yet another aspect, a method for supplying map data is provided that may generate a best route to a first destination. A request from a client device for a plurality of map partition data may be received, the map partition data may be portions of the map data representing a geographic region. The map data may also be operable for route generation toward a second destination. The plurality of map partition data may then be retrieved. Next, the plurality of map partition data may be transmitted to the client device.

In a further aspect, a system is provided that comprises a server, a memory storing at least one module and a plurality of map partition data, and a processor in communication with the memory so as to process the plurality of map partition data in accordance with instructions in the at least one module. The at least one module may have instructions to generate a best route to a first destination; to receive a request from a client device for a plurality of map partition data that are portions of the map data representing a geographic region, the map data being operable for route generation toward a second destination; to retrieve the plurality of map partition data; and to transmit the plurality of map partition data to the client device.

In yet another aspect, a method of displaying a route on a device is provided that transmits a start location and a destination location to a first computer over a network, the first computer may have access to data identifying a first set of road locations. A second set of road locations selected from a subset of the first set may be received over the network from the first computer, wherein the second set of road locations contains a first route comprising a contiguous series of road locations between the start location and the destination location, and further contains additional road locations that are within a geographic region proximate to the first route. A second route of contiguous road locations may be determined based on the road locations contained in the second set when data identifying a current location of the device indicates that the current location of the device is different than the road locations in the first route, wherein the second route is determined when the device is unable to receive the identification of road locations from the first computer. Next, the second route may be displayed on a display.

In a further aspect, a system of displaying a route on a device is provided comprising a memory storing at least one module, a processor in communication with the memory, and a display in communication with, and displaying information received from, the processor. The at least one module having instructions that instruct the processor to transmit a start location and a destination location to a first computer over a network, the first computer having access to data identifying a first set of road locations; to receive, over the network and from the first computer, a second set of road locations selected from a subset of the first set, wherein the second set of road locations contains a first route comprising a contiguous series of road locations between the start location and the destination location, and further contains additional road locations that are within a geographic region proximate to the first route; to determine a second route of contiguous road locations based on the road locations contained in the second set when data identifying a current location of the device indicates that the current location of the device is different than the road locations in the first route, wherein the second route is determined when the device is unable to receive the identification of road locations from the first computer; and to display the second route on a display.

In another aspect, a method for supplying road data may be provided that receives a start location and a destination location from a first computer over a network, and that transmits, to the first computer, a second set of road locations selected from a subset of the first set, wherein the second set of road locations contains a first route comprising a contiguous series of road locations between the start location and the destination location, and further contains additional road locations that are within a geographic region proximate to the first route.

DETAILED DESCRIPTION

In one aspect, partitioned map data is transmitted to a client device or a user device. Each map partition may contain road data, such as road geometries, road names, road network topology, or any other information needed to provide driving directions within the partition. Each map partition may be encoded with enough data to allow the partitions to be stitched together to form a larger map. Map partitions may be fetched along each route to be used in the event that the navigation server is not accessible. For example, if a user deviates from the original route and a network outage occurs, the map data may be assembled and a routing algorithm may be applied to the map data in order to direct the user back to the original route.

Figure 1:
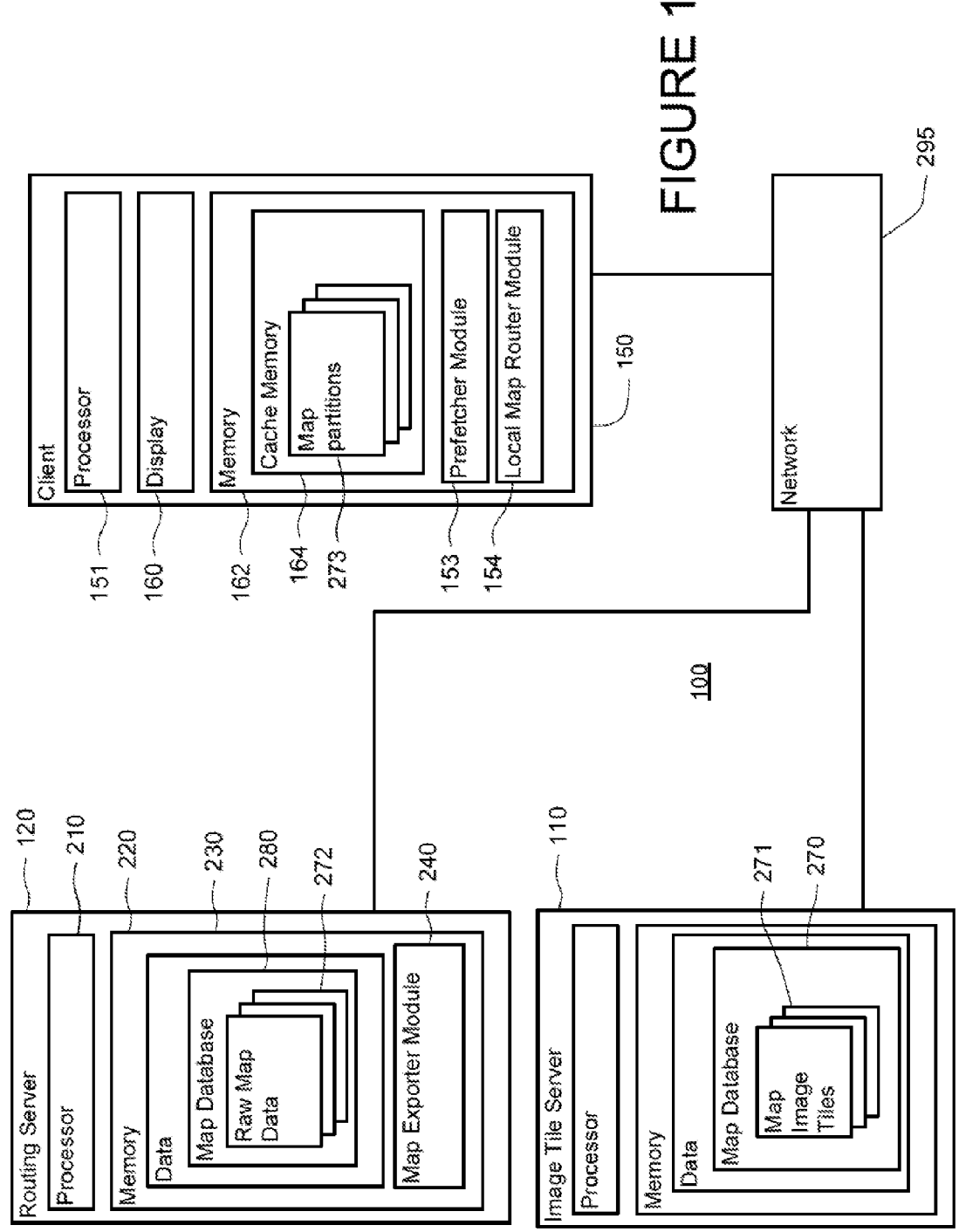
FIG. 1 is a functional diagram of a system.
Figure 2:
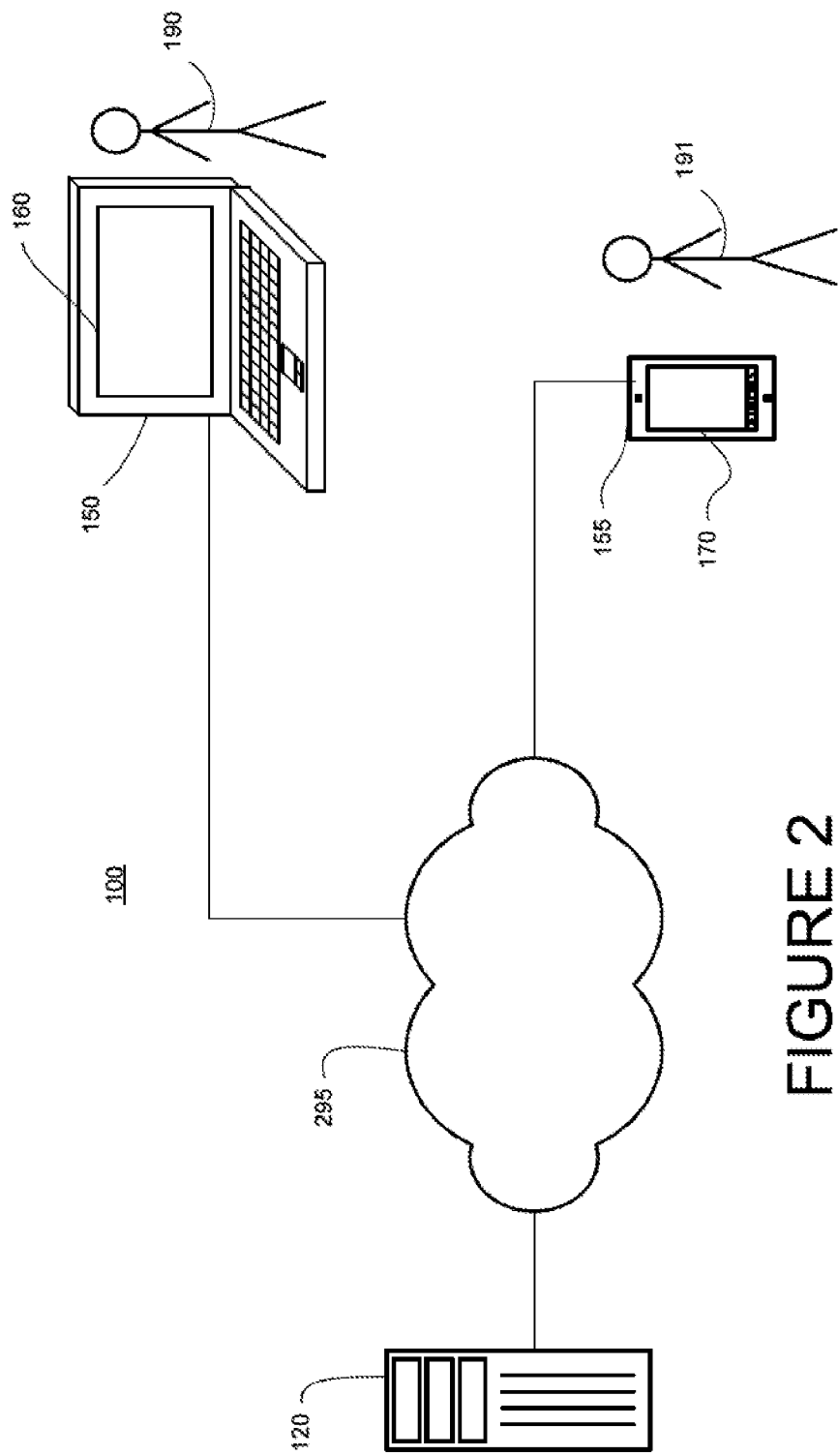
FIG. 2 is a pictorial diagram of a system.

As shown in FIGS. 1-2, a system 100 includes an image tile server 110 and a routing server 120 each containing a processor 210, memory 220 and other components typically present in general purpose computers. FIG. 1 also shows a client device or user device 150 containing a processor 151 and memory 162.

Memories 220 and 162 may store instructions and programs that are executable by processors 210 and 151, including map exporter module 240, prefetcher module 153, and local map router module 154. Memories 220 and 162 may also include data that may be retrieved, manipulated or stored by processors 210 and 151, such as raw map data 272 of routing server 120 and map image tiles 271 of image tile server 110. The memories 220 and 162 may be of any type capable of storing information accessible by processors 210 and 151, such as a hard-drive, memory card, RAM, DVD, CD-ROM, and write-capable memories. The processors 210 and 151 may be any well-known processor, such as processors from Intel Corporation or Advanced Micro Devices. Alternatively, the processors may be dedicated controllers such as an ASIC.

The map exporter module 240 may be any set of instructions to be executed directly (such as machine code) or indirectly (such as scripts) by the processor. Similarly, prefetcher module 153 and local map router module 154 may also be any set of instructions to be executed directly or indirectly by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Although FIG. 1 functionally illustrates the processors and memories as being within the same respective blocks, it will be understood that the processors and memories may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, a given processor may actually comprise a collection of processors which may or may not operate in parallel.

Routing server 120 may also comprise a plurality of computers, such as a load balancing network, that exchange information with different nodes of a network for the purpose of receiving, processing and transmitting map data to multiple client devices. In this instance, the client devices will typically still be at different nodes of the network than any of the computers comprising routing server 120.

In one aspect, routing server 120 communicates with one or more client computers 150, 170 as shown in FIG. 2. Each client device 150, 170 may be a laptop computer, intended for use by a person 190-191, having all the components normally found in a laptop computer such as a display 160 (for example, a monitor having a screen, a touch-screen, a small LCD screen, or another device such as an electrical device that is operable to display information processed by the processor), CD-ROM, hard-drive, user input (for example, a mouse, keyboard, touch-screen or microphone), speakers, modem and/or network interface device (telephone, cable or otherwise) and all of the components used for connecting these elements to one another.

Although the client computers 150 and 170 may comprise laptop computers, the system and method may also be used in connection with mobile devices capable of wirelessly exchanging data with a server over a network such as the Internet. For example, client computer 170 may be a wireless-enabled PDA or an Internet-capable cellular phone. In either regard, the user may input information using a keypad (in the case of a typical cell phone), a touch screen (in the case of a PDA) or any other means of user input.

Client computers 150 and 170 may include a component to determine the geographic location of the device. For example, mobile device 170 may include a GPS receiver 155. By way of further example, the component may include software for determining the position of the device based on other signals received at the mobile device 170, such as signals received at a cell phone's antenna from one or more cell phone towers if the mobile device is a cell phone.

The image tile server 110, routing server 120, and client computers 150 and 170 are capable of direct and indirect communication with each other, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Raw map data 272 may be retrieved, stored or modified by processors 210 and 151 in accordance with the instructions in map exporter module 240 and prefetcher module 153, and local map router module 154. Although the system and method is not limited by any particular data structure, its data may be stored in computer registers, in a relational database as a table having a plurality of different fields and records, extended markup language ("XML") documents, or flat files. The data may also be formatted in any computer-readable format. Raw map data 272 may include road data used for generating routes.

Map database 270 of image tile server 110 desirably stores map-related information, at least a portion of which may be transmitted to a client device. For example, map database 270 may store map image tiles 271, where each tile is a map image of a particular geographic area. Depending on the resolution (e.g., whether the map is zoomed in or out), one tile may cover an entire region, such as a state, in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the image tile server 110 is capable of selecting, retrieving and transmitting one or more tiles in response to receipt of a geographical location. Map tile locations may be expressed as tile coordinates or other data capable of identifying a geographic area.

Map database 280 contained in data 230 of routing server 120 may store raw map data 272 made up of map partitions of road data covering one or more geographic areas. For example, each map partition may represent a particular neighborhood, city, state, country, etc. As will be explained in further detail below, each map partition may be assembled or stitched to other map partitions. Stitching the multiple map partitions may form a larger map representation. Map locations may be expressed as latitude/longitude positions or other data capable of identifying one or more geographic locations. In one example, map partitions 273 may be transmitted to a client device in a wire format, such as XML. Each map partition 273 may cover an area equal to a respective map image tile 271 and may also cover the same zoom level as the respective map image tile. Across zoom levels, 100 times the covered area may be cached in the same amount of space in contrast to a system which relies on ongoing or continuous access to a map server. In one example, caching may be automatic, for instance activating a prefetching or other caching process when the user's device has WiFi or other network access.

Figure 3:
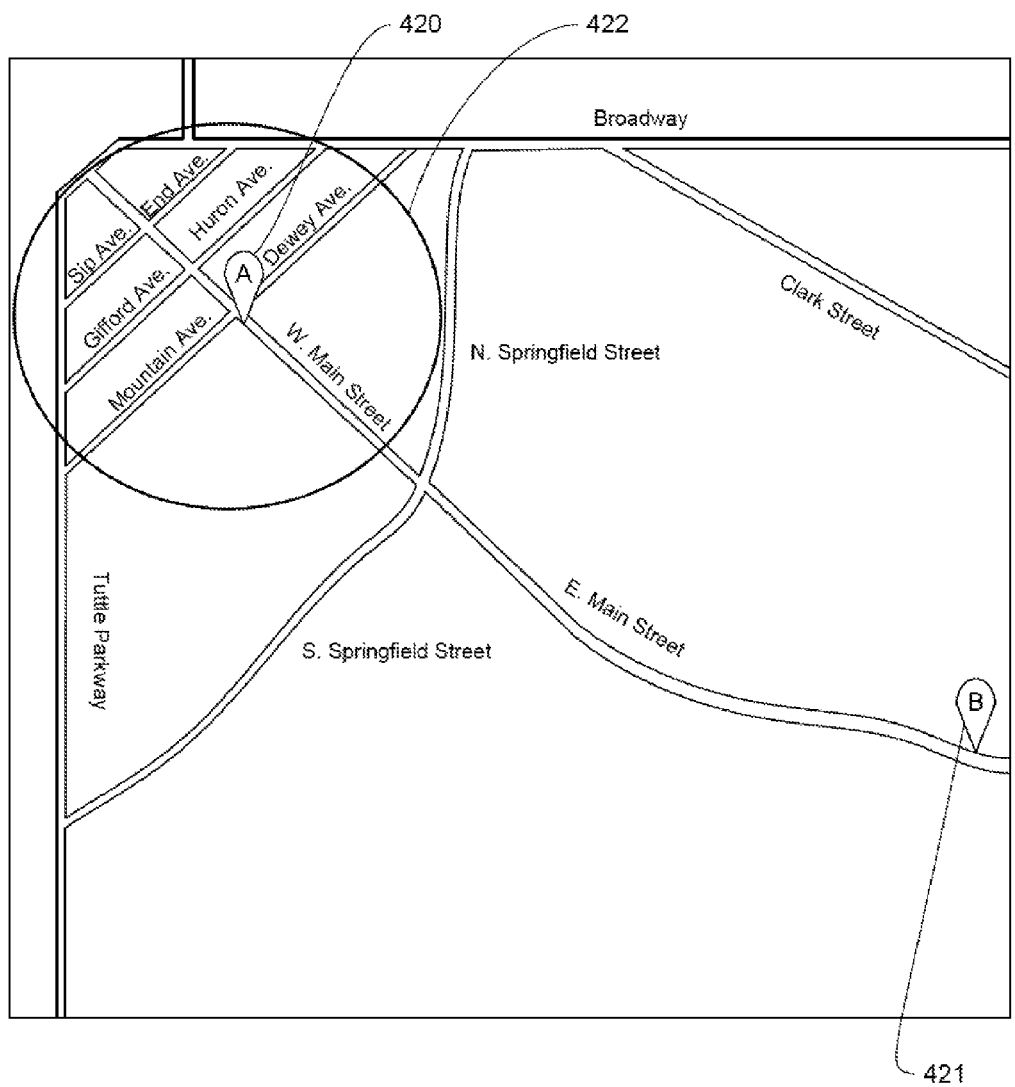
FIG. 3 is a sample map image.
Figure 4:
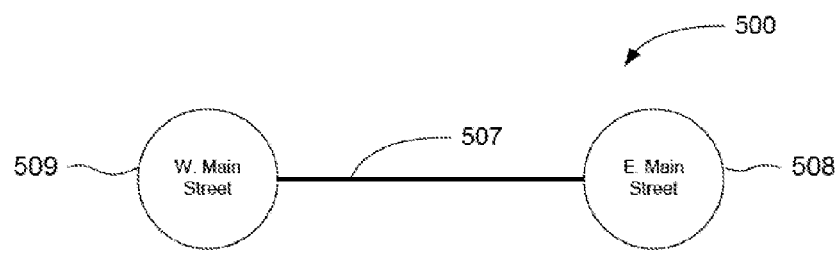
FIG. 4 is a diagram illustrating an example of a map data model of a route.
Figure 5:
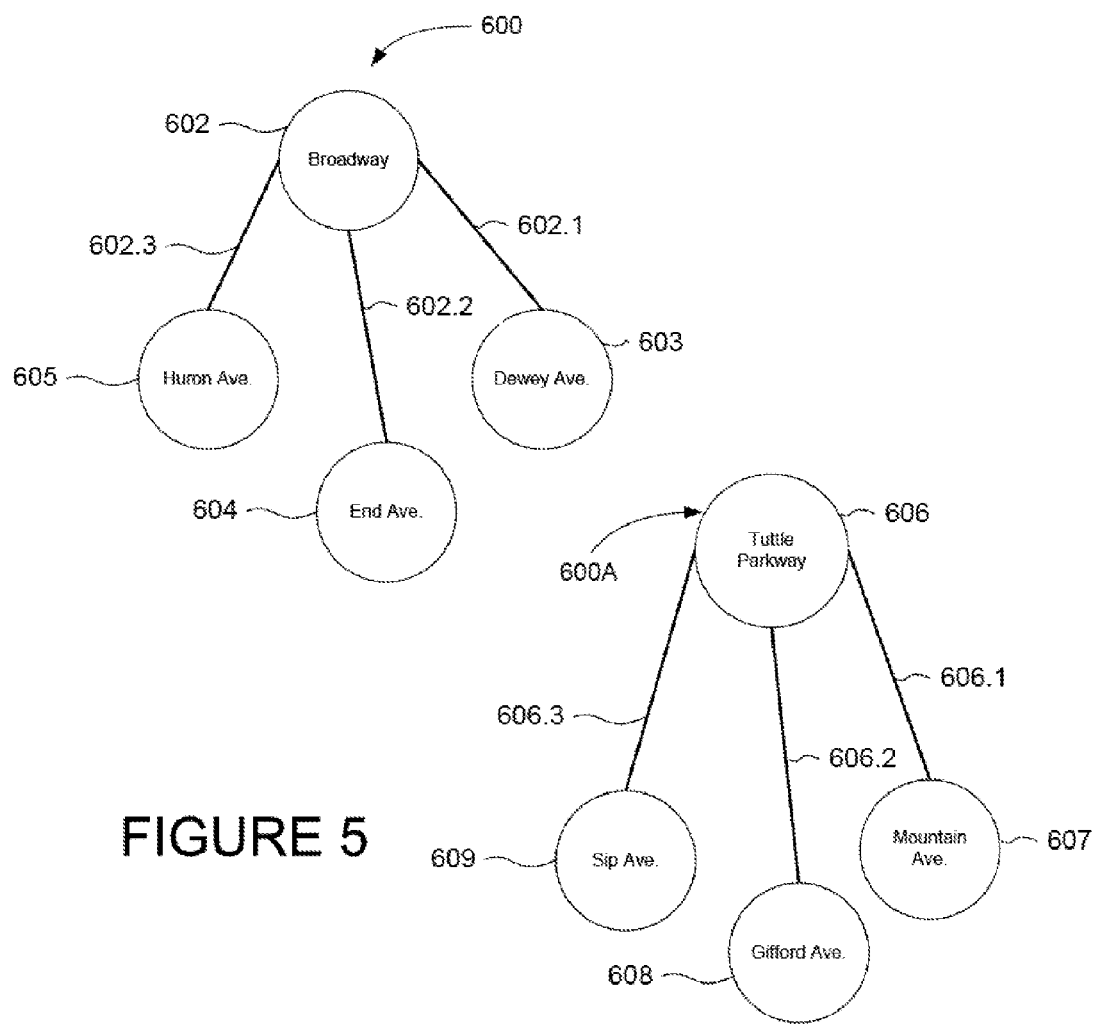
FIG. 5 is another diagram illustrating a map data model of a sub-map area.

FIG. 3 shows an illustrative map having starting point A corresponding to starting position 420 and a destination point B corresponding to destination position 421. FIGS. 4-5 are example data models of the map shown on FIG. 3. While FIGS. 4-5 show the raw map data 272 modeled as a graph, any other data model capable of operating within a routing algorithm may be adapted.

Returning to FIG. 3, this illustration also shows sub-map area 422 in addition to starting and ending positions 420 and 421, respectively. Sub-map area 422 may be a range of geographic positions based on the position 420 of a user, such as an area that includes potential route segments that surround position 420 for a predetermined radius. In one example, prefetcher module 153 of client device 150 may request sub-map data from routing server 120 of the roads falling within the predetermined sub-map area 422, and store it in cache memory 164 as illustrated in FIG. 1 or any other storage medium. Local map router module 154 may apply a routing algorithm to the map partition data 273 so as to continue generating routes despite the lack of network connectivity. Sub-map area 422 may cover all roads within a particular distance of starting position 420, ending position 421, or all the roads in the route originally generated by the routing server 120. In addition to the sub-map data, the respective map image tiles 271 may also be prefetched in order to render the map on screen.

The zoom level of each map partition 273 and its corresponding image tile 271 may be scaled in a variety of ways. For example, a zoom level of 0 may display the entire planet while a zoom level of 21 may display individual buildings. The precached map data and corresponding image data may be set to different zoom levels. The chosen zoom level may be based on whether a strong network connection exists. In one example, if a strong network connection exists, a higher zoom level may be cached.

Alternatively, sub-map area 422 may be cells of a spatial index. The cells may be contained in a node or index that is part of a larger hierarchy of interconnected nodes. Each level of the hierarchy may represent a different zoom level. The higher the zoom level, the larger the number of cells in the node and the smaller the size of each cell. The level of the spatial index node may coincide with the zoom level of the sub-map data. The cells covered by the desired sub-map area may be precached by prefetcher module 153.

The prefetcher module 153 may cache appropriate cells of particular nodes at different levels and allow the local map router module 154 to provide more flexible routes. For example, routes through smaller corridors may be generated. In this case, while it may be appropriate in certain circumstances to cache various contiguous areas of map data sufficient for both map rendering and offline routing, not all contiguous portions of the map may need to be cached with the same granularity. While cached regions may be identified by latitude, longitude and radius, a cell-type spatial index may also be used. Thus, if a user commutes from City A to City B, a smaller corridor of cells may be cached for the roads along the route, whereas larger regions may be cached at the starting and destination points. In this case, one vector zoom level may be cached to provide sufficient detail to the user, and depending on network connectivity, one or more additional zoom levels may be fetched for more detailed data.

FIG. 4 shows map data representing the best route from starting point 420 to destination point 421. The best route may be the shortest route, the least congested route, safest route, most scenic route, or any other route that is based on criteria used by the routing algorithm. Multiple factors may be considered for determining a best route. This route may be generated by a routing server 120. The client 150 may then request image data from image tile server 110 in order to render the map image on the screen. FIG. 4 also shows segment 509 representing "W. Main Street" linked to segment 508 representing "E. Main Street" via arc 507. Route 500 may be the best route generated by routing server 120.

FIG. 5 shows an example of sub-map data 600 and 600A also modeled as graphs. Sub-map data 600 and 600A may fall within predetermined sub-map area 422. In particular, Sub-map data 600 shows segments 602-605 representing "Broadway," "Dewey Avenue," "End Avenue," and "Huron Avenue," respectfully. Three arcs 602.1-602.3 are shown projecting from segment 602. Segment 602 is connected to segment 603 via arc 602.1, segment 604 via arc 602.2, and segment 605 via arc 602.3.

Sub-map data 600A shows segments 606-609 representing "Tuttle Parkway," "Mountain Avenue," "Gifford Avenue," and "Sip Avenue," respectfully. Three arcs 606.1-606.3 are shown projecting from segment 606. In particular, segment 606 is connected to segment 607 via arc 606.1, segment 608 via arc 606.2, and segment 609 via arc 606.3.

Prefetcher module 153 may send a request to map exporter module 240 of routing server 120. Prefetcher module 153 may retrieve the map partitions 273 from routing server 120 based on the requested location. The requested location may lie within predetermined sub-map area 422. In one example, the prefetcher module 153 sends the request using a set of latitude/longitude coordinates lying within sub-map area 422. The latitude/longitude coordinates may be used to query map data from map exporter module 240 of routing server 120. Other formats for storing position data may also be used. For example, rather than being associated with absolute values such as latitude/longitude, the values may be relative and in any scale. Once the partitions are retrieved from map exporter module 240, prefetcher module 153 may store the map partitions 273 in cache memory 164 of client 150 for use in the event of a network outage or other loss of connectivity.

If client 150 is unable to communicate over the network, the processor may begin execution of local map router module 154 of client 150. Local map router module 154 may read the map partitions 273 stored in cache memory 164 and begin assembling a map. As stated in the earlier example, map partitions 273 may lie within sub-map area 422, which may be within a predetermined radius around the user. Alternatively, sub-map area 422 may be the entire city or state in which the user is traveling. By way of example, prefetcher module 153 may make map data requests every mile, every city, or every state or province. If a user crosses the border into a new state, prefetcher module 153 may delete map partitions 273 from the cache and request map data for the new state. Prefetcher module 153 may also request map data, such as all streets that are within a certain distance off of the route, or all streets that intersect the route at a point that is within a certain distance from the device's current location. Thus, cache memory 164 may maintain the most up to date map data available to the client 150.

Figure 6:
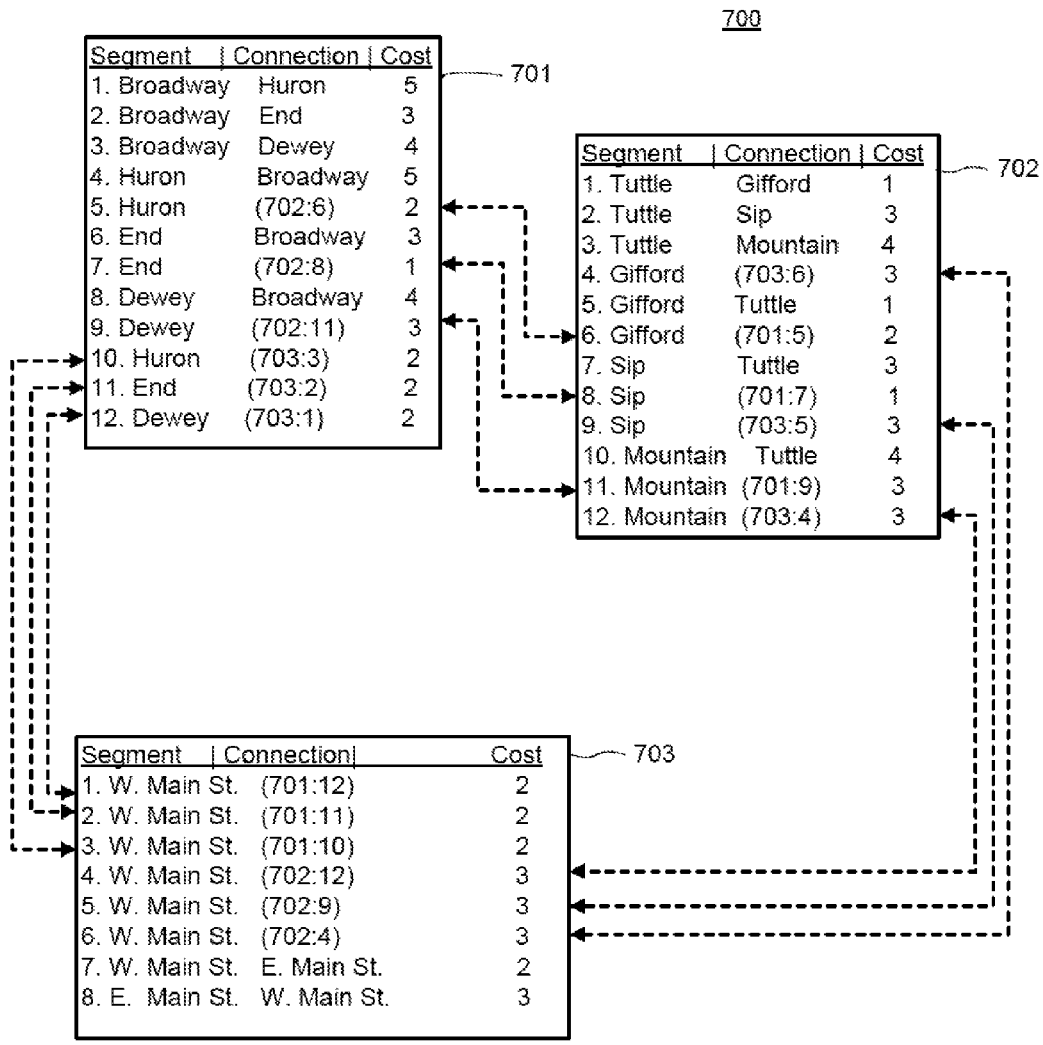
FIG. 6 is a functional diagram demonstrating an assembly of a map.

FIG. 6 illustrates an assembly of map partition data 700 representing portions within sub-map area 422 of FIG. 3. The assembly shown in FIG. 6 may be carried out by local map router module 154. By way of example, map partition 701 represents sub-map data 600 of FIG. 5, map partition 702 represents sub-map data 600A of FIG. 5, and map partition 703 represents the route 500 of FIG. 4. Each map partition is shown containing street interconnections within its respective partition and the "cost" of transitioning from one street to the next. If a connecting street lies outside the partition, the data may contain a reference to the partition containing the connecting street and the cost. The map partition data may be encoded in a variety of ways including, but not limited to, custom binary formats, XML, etc. While each map partition 701-703 is shown having only street connections and street transitioning costs, each map partition may also contain some or all of road geometries, road names, road network topology, or any other information used to provide driving directions. The driving directions may be provided to a user in accordance with various user interfaces. For example, the driving directions may be real-time turn-by-turn directions with vocal prompts, a one-time list of turns, a marked route on a map, etc.

Figure 7:
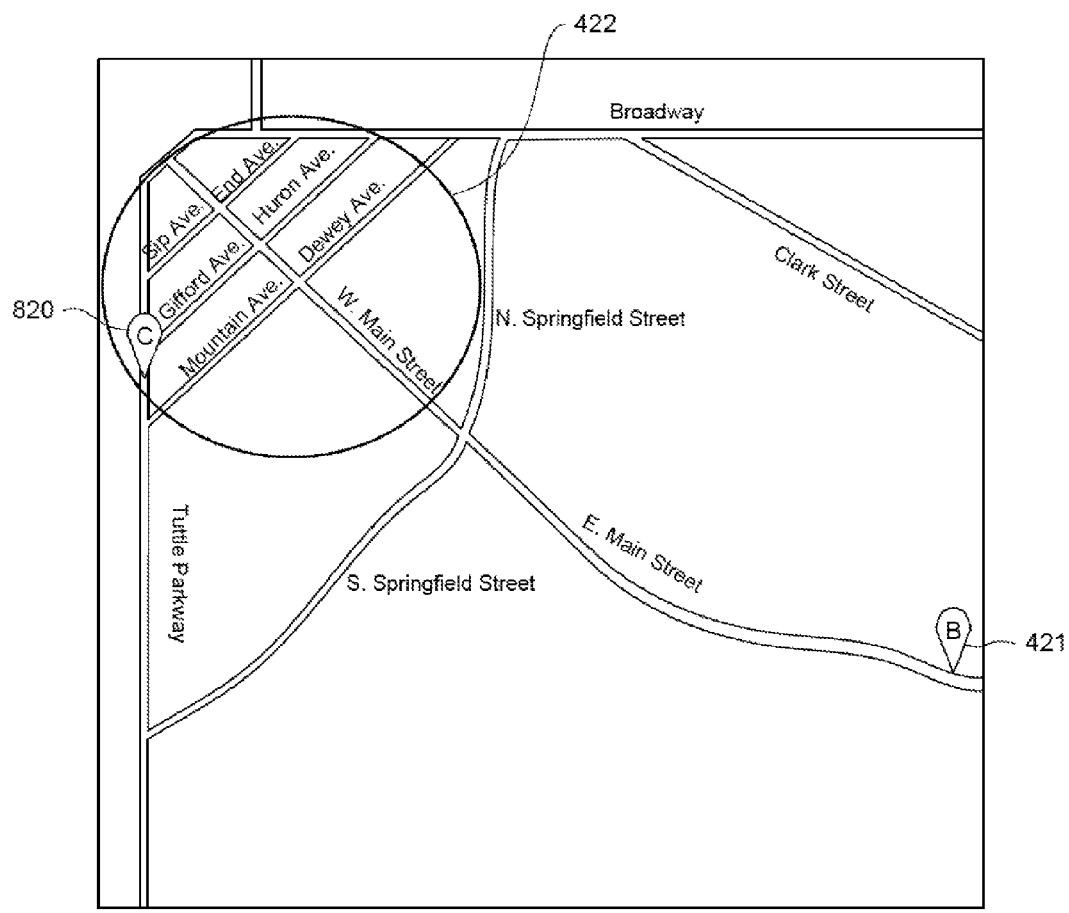
FIG. 7 is another map image depicting a user deviating from a main route.

FIG. 7 shows the user at location C corresponding with position 820. Position 820 is a deviation from route 500 of "W. Main Street" to "E. Main Street." If a network outage or other loss of connectivity occurs while the user is at position 820, local map router module 154 may assemble the map within sub-map area 422, as shown in FIG. 6, and apply a routing algorithm to the newly assembled map so as to generate a route to a destination. The routing algorithm may be any algorithm adapted to operate within the chosen data model. By way of example, the graph data model illustrated in FIGS. 4-5 may employ Dijkstra's algorithm, Floyd-Warshall's algorithm, Bellman-Ford's algorithm, etc.

Figure 8:
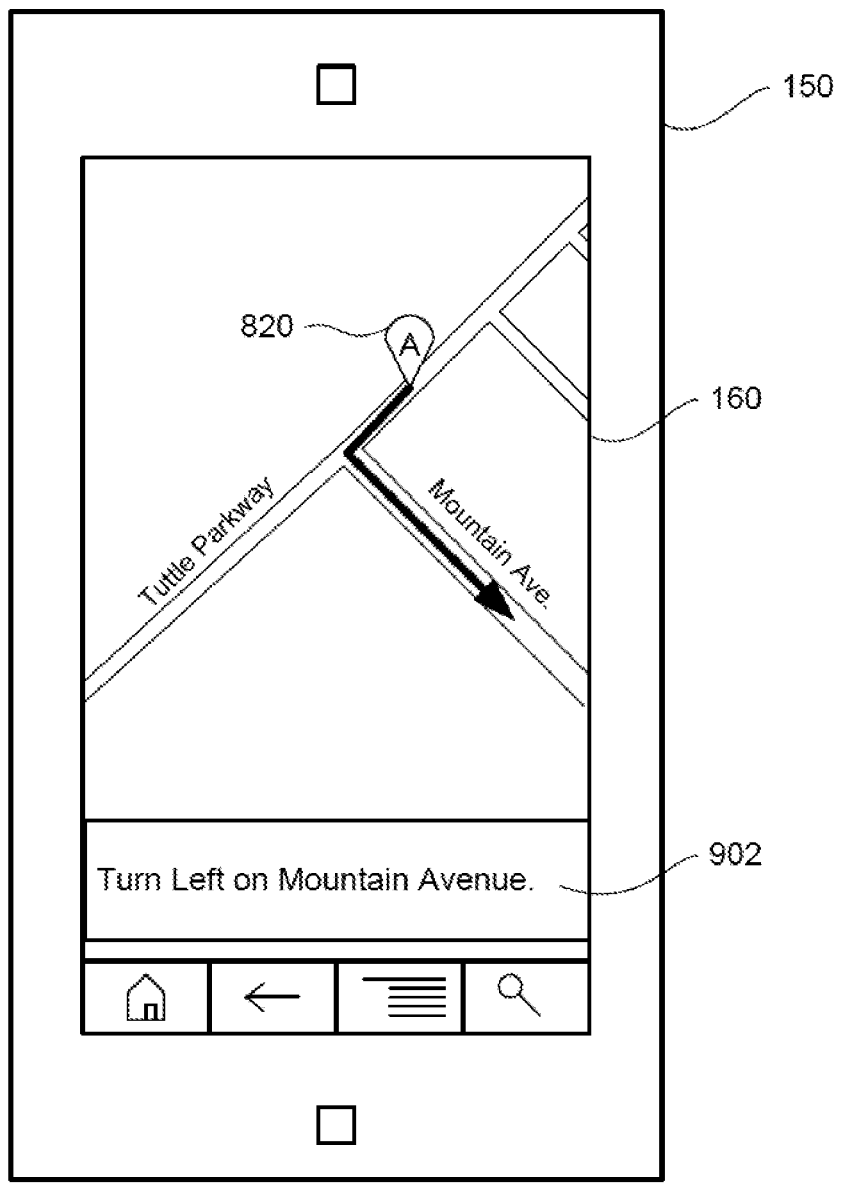
FIG. 8 is an example of a screen shot.

Once local map router module 154 calculates the best route back to the original route, client device 150 may render an image of the best route on display 160, as shown in FIG. 8. FIG. 8 also shows turn-by turn instructions 902 rendered on display 160. By way of example, local map router module 154 may determine that the best route back to "W. Main Street" from position 820 is to make a left on "Mountain Avenue," as depicted in FIG. 8.

Figure 9:
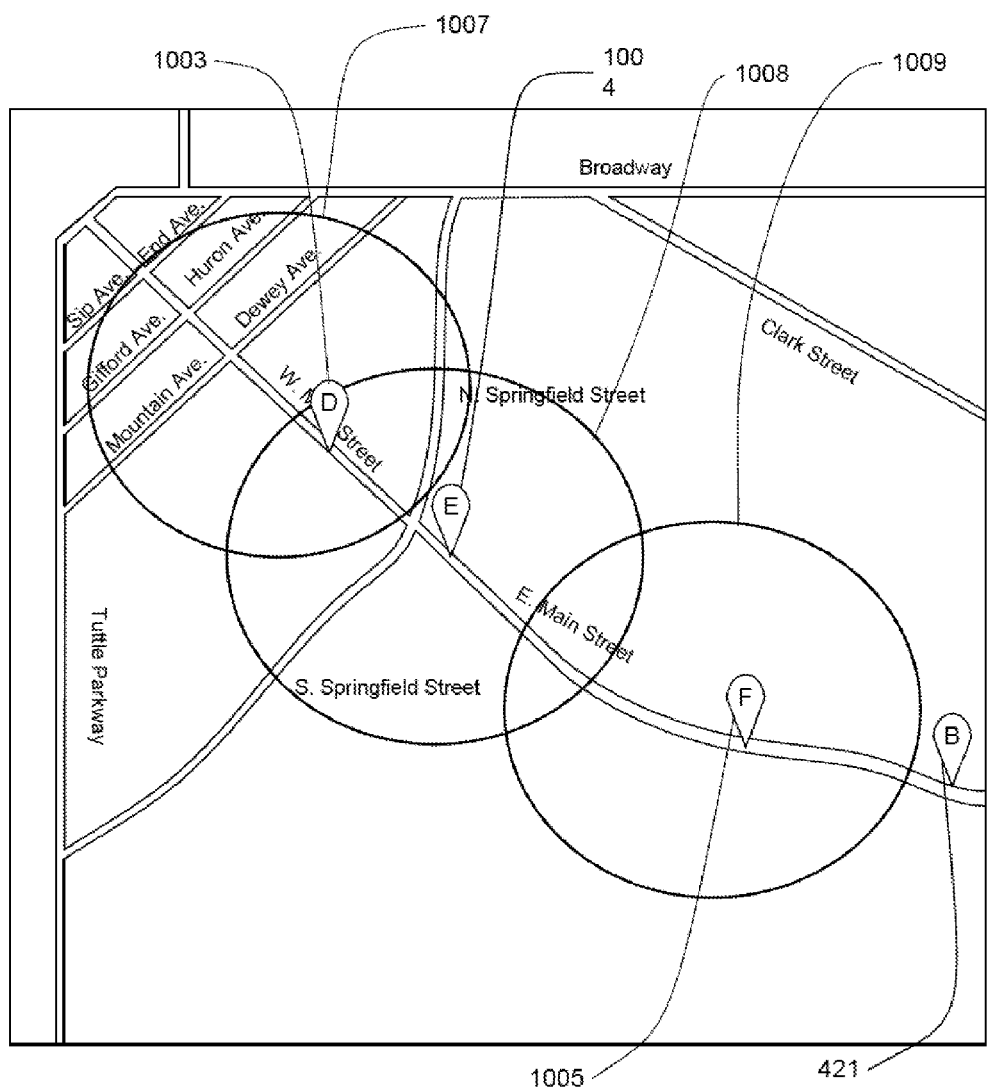
FIG. 9 is a example of a map image demonstrating predetermined sub map areas along a route.

FIG. 9 is an example of the prefetcher module 153 requesting sub-map information along a route. FIG. 9 shows sub-map areas 1007-1009 being requested as a user moves from positions D, E, and F, corresponding to positions 1003-1005, towards destination position 421. As explained earlier, sub-map areas may be predetermined radii around a user. These areas may be requested as a user moves towards a destination. When a new sub-map area is requested, cache memory 164 may be cleared to make room for the next sub-map area. The sub-map area may also be on a wider scale (e.g., city, country, state, etc.) in order to minimize the amount of prefetching from client to server.

The range encompassing precached segments may be expanded in areas known for weak network connectivity. Prefetcher module 153 may also request select areas along the route. For example, prefetcher module 153 may select sub-map area 1009 and 1008 only. Prefetcher module 153 may also select an area around the destination 421.

Prefetcher module 153 may be configured to automatically precache geographic areas a user is most likely to visit based on the user's travel history, search history, personal profile, calendar entries or other resource. The automatic precaching can be triggered when a user device is turned on and is in an area with network (e.g., WiFi) access. Automatic precaching may be enabled depending upon the type of network access available. Thus, when a free network is available, such as a WiFi network, the prefetcher module 153 may perform automatic prefetching. In another example, if a non-free network is available, automatic precaching may not be performed or user authorization may be required before incurring a charge.

The system and method may further require the user to consent to precaching various types of the geographic information before the information is transmitted to or stored by the client, and may further encrypt the precached data during the process of transmission and storage. Precached data may also be deleted automatically or manually upon request by a user.

In one example, a protocol may be defined to prefetch the user's most important N geographic areas (e.g., recently viewed places, frequently visited places, user's home town, or area of work). Each geographic location may be prefetched and stored in cache or permanently stored in some other storage area and loaded into cache at start up. This allows the cached map data to be personalized for a particular user. The precached map data may be automatically updated depending on relevant user events (e.g., moving to a new address, getting a new work address, changing travel habits, etc.). The N places may contain one or more pieces of information, such as name of the place, address, telephone number, latitude/longitude, type (e.g., starred or other type of point of interest), or another identifier.

In another aspect, a user may select the geographic locations for precaching. For example, a user may select an area the user plans to visit. The cache size may be set to a default or may be configurable by a user. A user may select these geographic areas directly on a mobile user device or may select them on a personal computer and synchronize the selected sub-map areas with the sub-map areas stored in the mobile device's cache. A user interface may show a list of places a user has explicitly cached. The list may show download progress for the caching of map data. The user interface may also allow for downloaded maps to be deleted. In one alternative, maps of user-specified places will always be kept, whereas maps of automatically determined places may be cached and deleted based upon usage.

In an alternative, other areas may be precached depending up different criteria. For instance, one or more points of interest may be cached at a very high level of detail, whereas other places may be cached at a very low detail level. In the former case, the user is more likely to want to view maps of those areas relatively frequently, and caching at a high level of detail ensures that detailed maps of the points of interest (e.g., starred or highly ranked places) are available even when network access is limited or nonexistent. In the latter case, this can be used to provide some basic map information to the user at any time.

In addition to the operations illustrated in the previous figures, various operations will now be described. It should be understood that the foregoing or following operations do not have to be performed in the precise order described below. Rather, various steps can be handled in reverse order or simultaneously. Other operations may be added or removed from these procedures.

Figure 10:
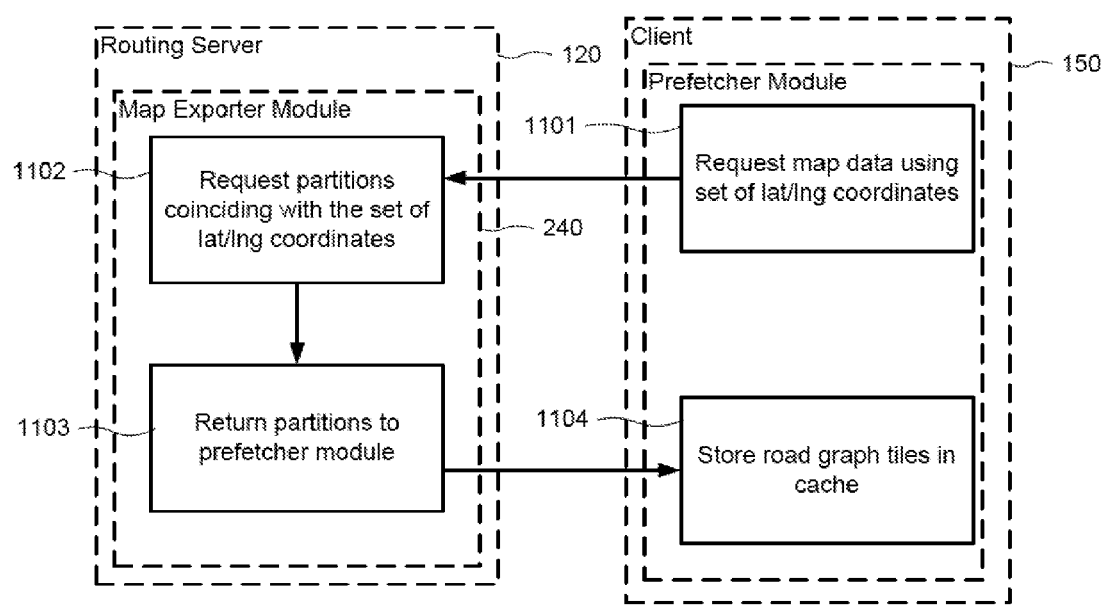
FIG. 10 is a flowchart of a method.

FIG. 10 shows an exemplary embodiment of a method 1100 for retrieving sub-map data partitions to a client device. First in block 1101, prefetcher module 153 sends a prefetch request for map partition data by sending a set of latitude/longitude coordinates that may fall within a sub-map area, such as sub-map area 422 of FIG. 3. Next, in block 1102, upon receiving the request for map partition data, map exporter module 240 may retrieve sub-map partitions from raw map data 272. Once the partitions falling within a sub-map area are retrieved, the partitions may be transmitted back to prefetcher module 153, in block 1103. In block 1104, the prefetcher module 153 may store the map partitions in cache memory. The prefetching method 1100 may be executed repeatedly every time the device travels beyond the area surrounding one location and into an area surrounding another location as demonstrated in FIG. 9. Alternatively, the prefetching method may be executed for select areas along a route.

Figure 11:
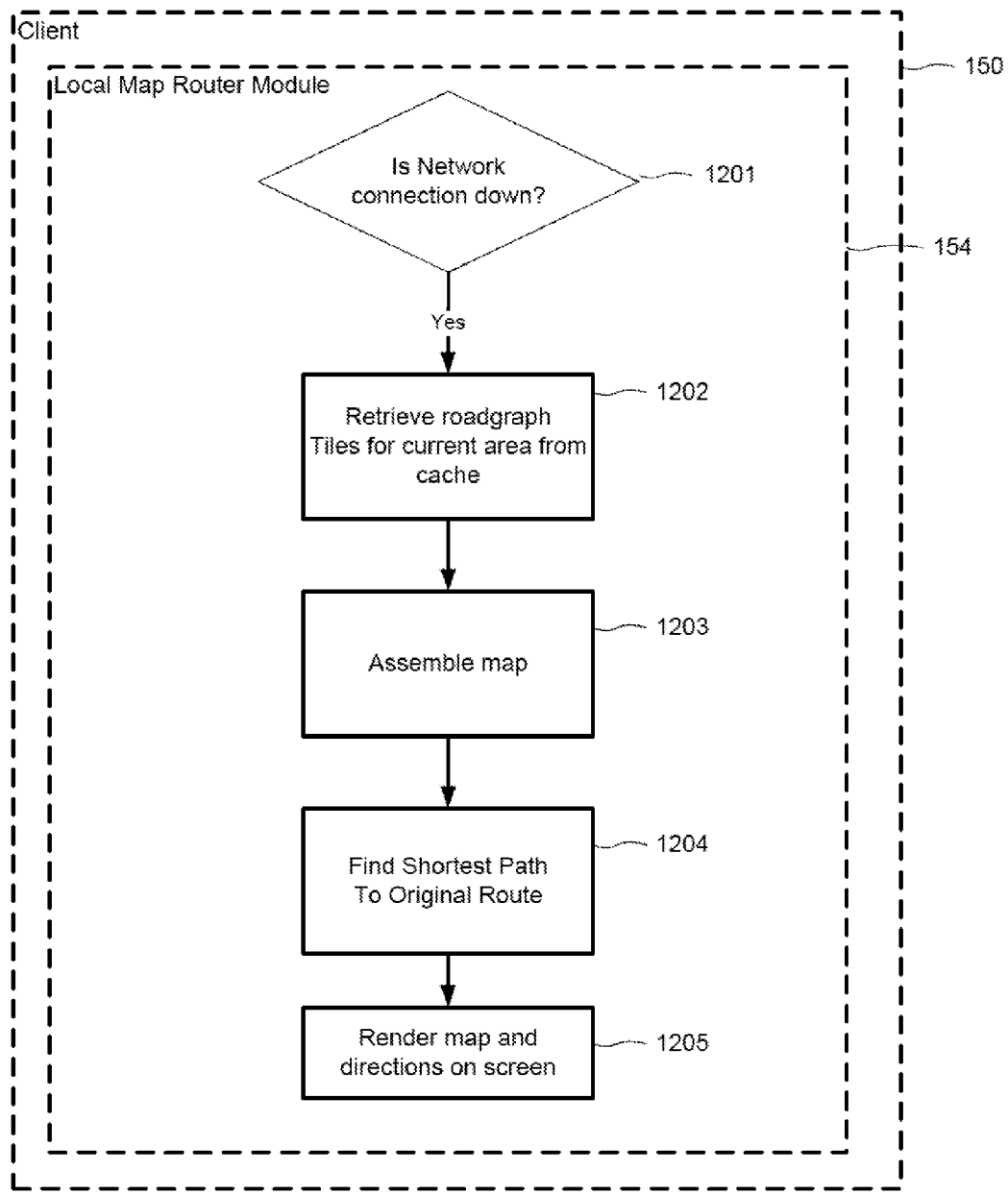
FIG. 11 is a flowchart of a method.

FIG. 11 is an exemplary process that may be executed by local map router module 154. First, in block 1201, local map router module 154 may determine whether a network outage or other loss of connectivity occurred. If one has occurred, local map router module 154 may advance to block 1202 and retrieve the map partition data stored in cache memory by prefetcher module 153. Upon retrieval of the map partition data, local map router module 154 may assemble the map data in block 1203. The map assembly may be carried out as demonstrated in FIG. 6. Once the map is fully assembled, a routing algorithm adapted for the chosen data model may be executed in block 1204 to generate a best route to the destination. By way of example, if a graph data model is employed, Dijkstra's algorithm may be used. Once the best route is determined, the path may be rendered on a screen, accompanied by step-to-step instructions, as shown in block 1205.

Figure 12:
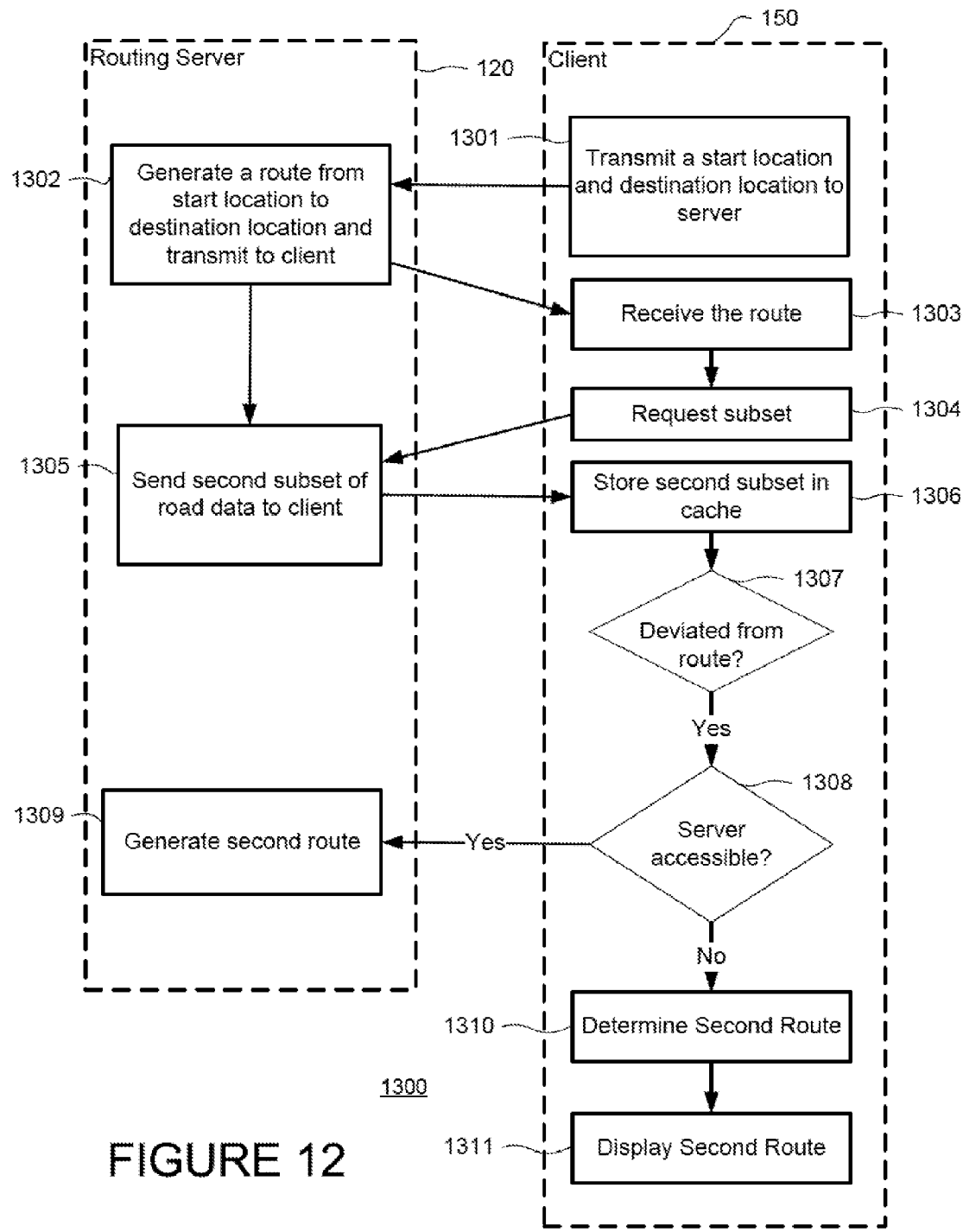
FIG. 12 is a flowchart of a method.

FIG. 12 is another exemplary embodiment of a method 1300 that may be executed between different modules in the server 120 via processor 210 and client 150 via processor 151. In block 1301, the processor 151 may transmit a start location and a destination location to server 120 so as to request a route. In block 1302, processor 210 of server 120 may generate a route from the start location to the destination location contained in a subset of raw map data 272. The subset may delineate a contiguous series of roads between the start location and the destination location. The route may be received by processor 151 of client 150 in block 1303. In block 1304, the processor 151 may transmit a request for another subset of raw map data 272. In block 1305, processor 210 of server 120 may transmit the other subset to client 150. The other subset may be selected from a geographic region that surrounds the user. Alternatively, the geographic region of the other subset may be select areas along the aforementioned contiguous series of roads, such as, an area around the start location, the destination location, or any other area along the route. In addition, the other subset may also delineate the originally requested route via the aforementioned contiguous series of roads.

In block 1306, upon receipt of the other subset of the raw map data 272, processor 151 of client 150 may store the other subset in cache. In block 1306, the processor 151 of client 150 may determine whether the client 150 has deviated from the contiguous series of roads of the route. If it is determined that the client device 150 has deviated, the processor 151 may advance to block 1308 to determine if the server 120 is accessible so that the processor 151 may transmit an additional request for a route. If the server 120 is not available, the processor 151 may advance to block 1310 and generate a new route to another destination location based on the plurality of other roads contained in the other subset of the raw map data 272. The other destination may be the same as the originally generated destination or the other destination may be different than the originally generated destination. If the server 120 is available, the processor 151 may request server 120 to generate the second route in block 1309. The processor 151 of client 150 may then display the second route on a display in block 1311.

While various references have been made to certain modules, namely, map exporter module 240, prefetcher module 153, and local map router module 154, any number of different modules may be used and run on a client and/or a server. The modules discussed are merely illustrative and different aspects of the system and method may use different modules.

In a further example, offline re-routes back to the route the user is following may also be generated to provide turn-by-turn guidance in the absence of a network connection. When a long route is requested when the client device has network access, the return trip may also be fetched, and together with offline rerouting allows navigating home in the absence of a network connection.

In yet another example, requests for tiles to be downloaded (for user-specified places) and requests for tiles to be cached (for automatically determined places) may be distinguishable from ordinary on-demand map tile requests. This can be used for both logging analysis and to enabling the server to deny a cache request when it is not allowed. In order to avoid having to download tiles that have already been fetched for display, a list of tiles are already in the request may be maintained.

As these and other variations and combinations of the features discussed above can be utilized without departing from the systems and methods as defined by the claims, the foregoing description of exemplary embodiments should be taken by way of illustration rather than by way of limitation of the subject matter defined by the claims. It will also be understood that the provision of examples (as well as clauses phrased as "such as," "e.g.", "including" and the like) should not be interpreted as limiting the claimed subject matter to the specific examples; rather, the examples are intended to illustrate only some of many possible aspects. Unless expressly stated to the contrary, every feature in a given embodiment, alternative or example may be used in any other embodiment, alternative or example herein.

The invention claimed is:

1. A method of generating a route to a destination comprising:
   prefetching, with a processor, a plurality of map partition data from a remote computer at a first point in time, each of the plurality of map partition data being encoded with information for generating driving directions for a first area corresponding to one or more map image tiles, wherein the first area includes a first sub-map area and a second sub-map area, wherein it is known that network connectivity in the first sub-map area is weaker than network connectivity in the second sub-map area, and more map partition data is prefetched for the first sub-map area than for the second sub-map area based on the respective connectivity;
   storing the plurality of map partition data in a memory;
   determining whether the remote computer is accessible;
   assembling, with the processor, map data representing a geographic region, the map data being an assemblage of map partition data of the stored plurality of map partition data stitched together to form a larger map from the one or more map image tiles if it is determined that the remote computer is not accessible; and
   generating, with the processor, a route to a destination using the map data.

2. The method of claim 1, wherein in the assembling the map data representing the geographic region, the geographic region is based on the current position of the user device or a segment of the route, the geographic region including segments that are not on the generated route.

3. The method of claim 2, further comprising prefetching a second plurality of map partition data if it is determined that the user device has traveled beyond an area surrounding one location and into an area surrounding another location.

4. The method of claim 1, wherein the plurality of map partition data is a first plurality and the method further comprises:
   fetching, with the processor, a second plurality of map partition data different from the first plurality from the remote computer at a second point in time later than the first point in time, each of the second plurality of map partition data being encoded with information for generating driving directions for a second area corresponding to one or more map image tiles, wherein the second area extends a predetermined radius from a current position of a user device;
   wherein the second area partially intersects with the first area.

5. The method of claim 1, wherein each of the plurality of map partition data is further encoded with information to stitch the plurality of map partition data to each other so as to assemble the map data.

6. The method of claim 1, wherein generating the route comprises applying a routing algorithm to the map data.

7. The method of claim 1, wherein assembling the map data comprises constructing a graph.

8. The method of claim 7, wherein in the assembling the map data, each of the plurality of map partition data is structured as a different portion of the graph.

9. An apparatus comprising:
   a memory caching map partition data;
   a processor in communication with the memory so as to process the map partition data in accordance with instructions, the processor configured to:
      prefetch a plurality of map partition data from a remote computer at a first point in time, each of the plurality of map partition data being encoded with information for generating driving directions for a first area corresponding to one or more map image tiles, wherein the first area includes a first sub-map area and a second sub-map area, wherein it is known that network connectivity in the first sub-map area is weaker than network connectivity in the second sub-map area, and more map partition data is prefetched for the first sub-map area than for the second sub-map area based on the respective connectivity;
      store the plurality of map partition data in the memory;
      determine whether the remote computer is accessible;
      retrieve the stored plurality of map partition data from the memory, if it is determined that the remote computer is not accessible;
      assemble map data representing a geographic region, the map data being an assemblage of map partition data of the stored plurality of map partition data stitched together to form a larger map from the one or more map image tiles; and
      generate a route to a destination using the map data; and
   a display in communication with, and displaying information received from, the processor.

10. The apparatus of claim 9, wherein the geographic region is either a predetermined range from a current position of the apparatus or a predetermined range from a segment of the route.

11. The apparatus of claim 10, wherein the processor is further configured to prefetch a second plurality of map partition data if it is determined that the apparatus has traveled beyond an area surrounding one location and into an area surrounding another location.

12. The apparatus of claim 9, wherein in generating the route, the processor is configured to generate a shortest route or a least congested route.

13. The apparatus of claim 9, wherein the route is generated by applying one of Dijkstra's routing algorithm, Floyd-Warshall's routing algorithm, and Bellman-Ford's routing algorithm to the map data.

14. The apparatus of claim 9, wherein the map data is structured as a graph.

15. A non-transitory computer readable medium storing instructions executable by a computing device to perform a method of generating a route to a destination, the method comprising:
  prefetching a plurality of map partition data from a remote computer at a first point in time, each of the plurality of map partition data being encoded with information for generating driving directions for a first area corresponding to one or more map image tiles, wherein the first area includes a first sub-map area and a second sub-map area, wherein it is known that network connectivity in the first sub-map area is weaker than network connectivity in the second sub-map area, and more map partition data is prefetched for the first sub-map area than for the second sub-map area based on the respective connectivity;
  storing the plurality of map partition data in a memory;
  determining whether the remote computer is accessible;
  assembling map data representing a geographic region, the map data being an assemblage of map partition data of the stored plurality of map partition data stitched together to form a larger map from the one or more map image tiles if it is determined that the remote computer is not accessible; and
  generating a route to a destination using the map data.

16. The non-transitory computer readable medium of claim 15, wherein in the assembling the map data representing the geographic region, the geographic region is based on the current position of the user device or a segment of the route, the geographic region including segments that are not on the generated route.

17. The non-transitory computer readable medium of claim 16, the method further comprising prefetching a second plurality of map partition data if it is determined that the user device has traveled beyond an area surrounding one location and into an area surrounding another location.

18. The non-transitory computer readable medium of claim 15, wherein generating the route comprises generating a shortest route or a least congested route.

19. The non-transitory computer readable medium of claim 15, wherein each of the plurality of map partition data is further encoded with information to stitch the plurality of map partition data to each other so as to assemble the map data.

20. The method of claim 15, wherein generating the route comprises applying a routing algorithm to the map data.

21. The non-transitory computer readable medium of claim 15, wherein assembling the map data comprises constructing a graph.

22. The non-transitory computer readable medium of claim 21, wherein each of the plurality of map partition data is structured as a different portion of the graph.

* * * * *